United States Patent [19]

Hennessy

[11] Patent Number: 4,842,327
[45] Date of Patent: Jun. 27, 1989

[54] CONVERTIBLE VEHICLE HAVING DUAL REAR QUARTER WINDOW ASSEMBLY

[75] Inventor: Robert E. Hennessy, Allen Park, Mich.

[73] Assignee: Cars & Concepts, Inc., Brighton, Mich.

[21] Appl. No.: 164,553

[22] Filed: Mar. 7, 1988

[51] Int. Cl.⁴ .............................. B60J 1/14; B60J 7/12
[52] U.S. Cl. ..................................... 296/201; 296/107; 296/147; 296/206; 49/227
[58] Field of Search ............... 296/107, 146, 147, 201, 296/206, 186; 49/227, 350, 483

[56] References Cited

U.S. PATENT DOCUMENTS

| | | | |
|---|---|---|---|
| 1,826,922 | 10/1931 | Carr | 296/186 |
| 2,466,326 | 4/1949 | Parsons | 296/117 |
| 2,795,455 | 6/1957 | Earl | 296/146 X |
| 2,797,958 | 7/1957 | Podolan | 49/483 X |
| 3,536,354 | 10/1970 | Ingram | 296/107 X |
| 3,888,044 | 6/1975 | Lystad | 49/227 |
| 3,930,337 | 1/1976 | Quesnel et al. | 49/227 |
| 4,572,570 | 2/1986 | Trucco | 296/107 |

FOREIGN PATENT DOCUMENTS

| | | | |
|---|---|---|---|
| 3416286 | 10/1984 | Fed. Rep. of Germany | 296/116 |
| 728718 | 4/1955 | United Kingdom | 296/107 |

Primary Examiner—Dennis H. Pedder
Attorney, Agent, or Firm—Brooks & Kushman

[57] ABSTRACT

A rear quarter window assembly (26) for use with a vehicle convertible top (20) is disclosed as including a first rear quarter window (34) movable between closed and open positions by a window regulator (36) and having a rear edge (38) that is spaced forwardly from the raised convertible top frame (22). A second rear quarter window (40) of the window assembly is mounted on the frame (22) of the convertible top for movement between closed and open positions as the convertible top frame is moved between raised and storage positions. This second rear quarter window (40) has a front edge (42) that seals with the rear edge (38) of the first rear quarter window. A seal (44) provides the sealing between the first and second rear quarter windows (34,40) at their rear and forward edges (38,42). The seal (44) preferably includes first and second seal members (46,48) one of which includes a portion (54) located between the rear edge (38) of the first rear quarter window (34) and the front edge (42) of the second rear quarter window (40). A groove and projection construction of the two seal members (46,48) cooperates with the sealing portion (54) to provide sealing between the first and second rear quarter windows (34,40) in the closed window positions with the convertible top raised.

16 Claims, 3 Drawing Sheets

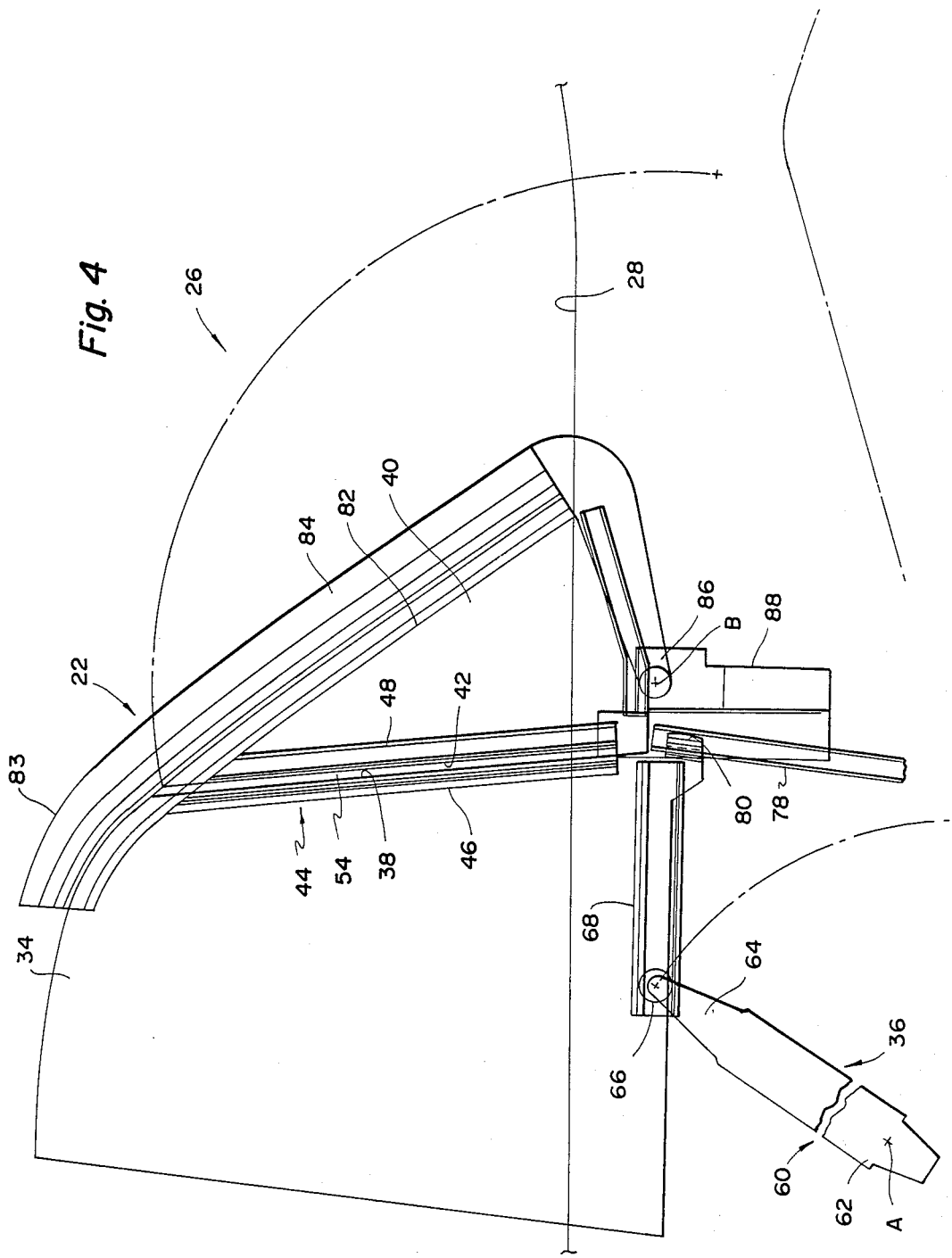

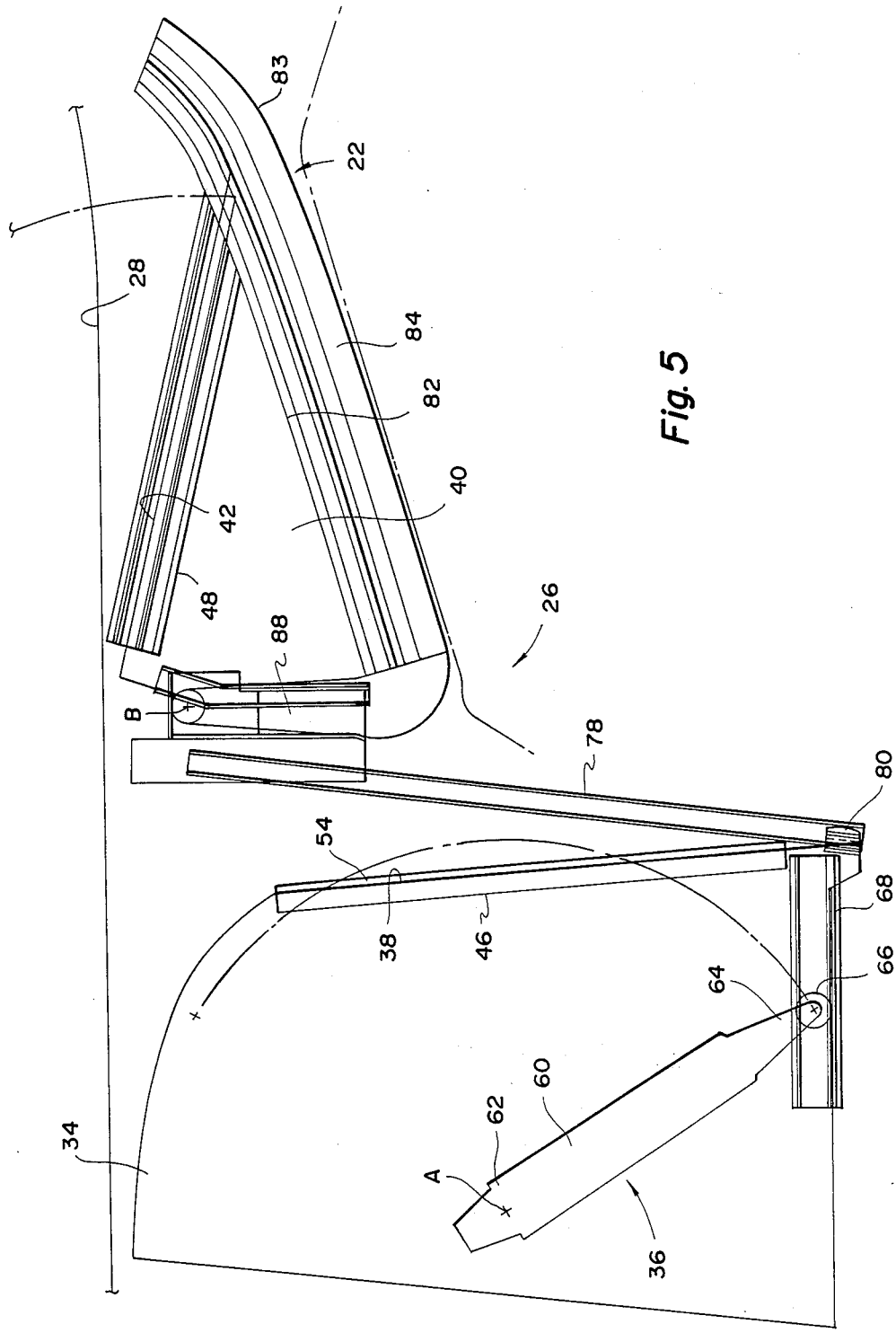

CONVERTIBLE VEHICLE HAVING DUAL REAR QUARTER WINDOW ASSEMBLY

TECHNICAL FIELD

This invention relates to a rear quarter window assembly for use with a convertible type vehicle.

BACKGROUND ART

Convertible type vehicles conventionally include rear quarter windows located at the lateral sides of the vehicle just behind the two side doors through which the driver and passengers gain access to the vehicle. Such rear quarter windows are normally movable vertically between an upper closed position and a lower open position with the movement being controlled by either a manually or power operated window regulator. Most conventional vehicle body designs have rear quarter constructions that limit the size of such vertically movable rear quarter windows. More specifically, the rear quarter fender structure usually does not have sufficient room permit the downward movement of a rear quarter window of a size necessary to fill the designed window opening area. With sedan or hard top type vehicles, it is possible to have the rear quarter window movable downwardly only to a partially open position so to permit the use of a larger rear quarter window opening than would otherwise be possible. However, such partial opening of the rear quarter window is not permitted with convertible type vehicles since design considerations dictate that the vehicle body have the capability of being completely open generally along the vehicle body belt line. This capability is necessary even though it is also desirable for the rear window to be movable to the upper closed position with the convertible top stored so that the vehicle occupants can limit wind within the vehicle during travel.

An alternative type of rear quarter window for a convertible type vehicle has previously been proposed as a window that is mounted on the convertible top frame so as to be movable between open and closed positions as the convertible top is raised and lowered. However, this type of window also is limited in size and does not have the capability of being movable to the closed position with the convertible top in its storage position.

DISCLOSURE OF INVENTION

An object of the present invention is to provide an improved rear quarter window assembly for a convertible type vehicle.

In carrying out the above object and other objects of the invention, a convertible type vehicle incorporating the invention includes an occupant compartment, a side door for providing access to the occupant compartment, and a convertible top having a frame and a soft top supported by the frame for movement between raised and storage positions with respect to the occupant compartment. The rear quarter window assembly is located to the rear of the side door and includes a first rear quarter window and a window regulator for moving the first rear quarter window vertically between an upper closed position and a lower open position. This first rear quarter window has a rear edge that is spaced forwardly from the frame of the raised convertible top with the first rear quarter window in the upper closed position. A second rear quarter window of the assembly has a rear edge fixedly mounted on the frame of the convertible top for movement in a substantially vertical plane between a closed position with the convertible top frame in the raised position and an open position with the convertible top frame in the storage position. The second rear quarter window has a front edge that seals with the rear edge of the first rear quarter window with both rear quarter windows in the closed positions.

Such a dual rear quarter window assembly permits a larger rear quarter window opening with a convertible top type vehicle than has heretofore been possible. Also, the first rear quarter window can be moved to its closed position even when the convertible top is down if it is desired to operate the vehicle with the top down and windows up so as to at least partially shield the vehicle occupants from the wind during vehicle travel.

In the preferred construction, the rear quarter window assembly includes a seal that provides sealing between the rear edge of the closed first rear quarter window and the front edge of the closed second rear quarter window. This seal preferably includes a first seal member on the rear edge of the first rear quarter window and a second seal member on the front edge of the second rear quarter window. Both the first and second rear quarter windows have inside surfaces on which the first and second seal members are mounted in the preferred construction.

As disclosed, the rear quarter window assembly has one of the seal members provided with a sealing portion located between the rear edge of the first rear quarter window and the front edge of the second rear quarter window. The first seal member on the rear edge of the first rear quarter window is the one which includes the sealing portion located between the rear edge of the first rear quarter window and the front edge of the second rear quarter window.

In the preferred construction of the rear quarter window assembly, the seal also has one of the seal members defining a groove and the other seal member including a projection that is received within the groove of the one seal member with the rear quarter windows in the closed position. The first seal member on the rear edge of the first rear quarter window is disclosed as defining the groove and the second seal member on the front edge of the second rear quarter window is disclosed as including the projection.

The preferred construction of the rear quarter window assembly also includes a guide that supports the first rear quarter window at its rear edge for vertical movement between the upper closed and lower open positions. This guide includes a track mounted on the vehicle and a slide fixed to the rear quarter window and slidably supported by the track.

In its preferred construction, the second rear quarter window has a rear edge that is inclined in the closed position. The convertible top frame has a side rail including a rear rail member that supports the rear edge of the second rear quarter window for movement thereof between the closed and open positions upon movement of the convertible top frame between the raised and storage positions.

The objects, features, and advantages of the present invention are readily apparent from the following detailed description of the best mode for carrying out the invention when taken in connection with the accompanying drawings.

BRIEF DESCRIPTION OF DRAWINGS

FIG. 4 is a side view of the rear quarter window assembly with both its first and second rear quarter windows shown in upper closed positions; and FIG. 5 is a side view of the rear quarter window assembly with both its first and second rear quarter windows shown in lower open positions.

BEST MODE FOR CARRYING OUT THE INVENTION

Figure 1:
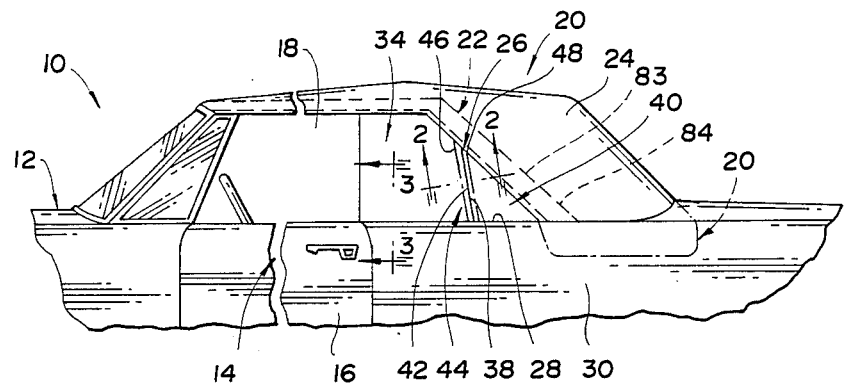
FIG. 1 is a partial side elevational view of a convertible type vehicle which includes a rear quarter window assembly constructed in accordance with the present invention.

With reference to FIG. 1 of the drawings, a convertible vehicle generally indicated by 10 includes a body 12 whose occupant compartment 14 is accessed through a side door 16 that is mounted by suitable hinges for opening and closing movement about its front edge. The side door 16 includes a side window 18 that is movable between an upper closed position and a lower open position by either a manual or power operated window regulator in a conventional manner. A convertible top 20 of the vehicle has a frame 22 and a soft top 24 mounted by the frame for movement with respect to the occupant compartment between the raised position shown by solid line illustration and the storage position shown by phantom line illustration. A rear quarter window assembly constructed in accordance with the present invention is generally indicated by 26 and is movable between upper closed and lower open positions as is hereinafter more fully described. The rear quarter window assembly 26 closes the rear quarter window area above the vehicle belt line 28 in its upper open position and is stored between the rear quarter fender 30 and an inner fender panel 32 (FIG. 3) when positioned in the lower stored position shown in FIG. 5 as is hereinafter more fully described.

Figure 2:
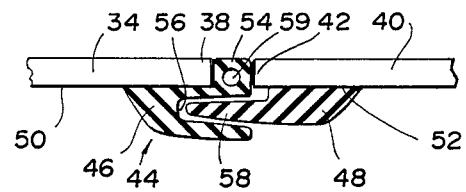
FIG. 2 is a partial sectional view taken along the direction of line 2—2 in FIG. 1 to illustrate the construction of a seal that functions between first and second rear quarter windows of the assembly.

With combined reference to FIGS. 1, 4, and 5, the rear quarter window assembly 26 of this invention includes a first rear quarter window 34 and a window regulator 36 that may be either of the manual or power operated type for moving the first rear quarter window between the upper closed position of FIGS. 1 and 4 and the lower open position of FIG. 5. As shown in FIG. 1, the first rear quarter window 34 has a rear edge 38 that is spaced forwardly from the frame 22 of the raised convertible top 20 in the upper closed position and cooperates therewith and with the belt line 28 to define a triangular space. A second rear quarter window 40 of the window assembly is mounted on the frame 22 of the convertible top 20 for movement between the closed position as shown in FIGS. 1 and 2 with the convertible top frame in the raised position and an open position as shown in FIG. 5 with the convertible top frame in the storage position. The second rear quarter window 40 has a front edge 42 that seals as shown in FIGS. 1 and 2 with the rear edge 38 of the first rear quarter window 34 with both rear quarter windows in the closed positions illustrated.

The dual window construction of the rear quarter window assembly 26 permits the rear quarter window opening to be much larger than has been possible in the past while still permitting the belt line 28 to be unobstructed with the convertible top stored and the rear quarter window assembly in its lower open position.

As best illustrated in FIG. 2, the rear quarter window assembly also preferably includes a seal 44 that provides sealing between the rear edge 38 of the first rear quarter window 34 and the front edge 42 of the second rear quarter window 40. This seal 44 includes a first seal member 46 on the rear edge 38 of the first rear quarter window 34 and also includes a second seal member 48 on the front edge 42 of the second rear quarter window 40. Both the first and second rear quarter windows 38 and 40 have inside surfaces 50 and 52, respectively, on which the first and second seal members 46 and 48 are respectively mounted. One of the seal members, preferably the first seal member 46 as shown in FIG. 2, includes a sealing portion 54 located between the rear edge 38 of the first rear quarter window 34 and the front edge 42 of the second rear quarter window 40.

One of the seal members, preferably the first seal member 46 on the rear edge 38 of the first rear quarter window 34, defines a groove 56 (FIG. 2) that is utilized in the sealing with both rear quarter windows closed. The other seal member 48 on the front edge 42 of the second rear quarter window 40 includes a projection 58 that is received within the groove 56 with the rear quarter windows in the closed positions as illustrated. Seal groove 56 and seal projection 58 thus cooperate with the sealing portion 54 to provides sealing between the first and second rear quarter windows in the closed positions while permitting separation of these rear quarter windows with respect to each other for movement to their open positions as illustrated in FIG. 5.

With reference to FIG. 2, each of the seal members 46 and 48 are secured to the inside glass surfaces 50 and 52, respectively, in any suitable manner such as by molding in situ or by use of a suitable adhesive, etc. Both seal members 46 and 48 are made of a relatively hard seal material of any suitable composition, while the sealing portion 54 is preferably made of a softer sealing material. This softer sealing portion 54 of the harder seal member 46 can be coextruded therewith so as to provide the dual hardness construction. Also, the softer sealing portion 54 has a central opening 59 which facilitates flexing thereof between the window edges 38 and 42.

Figure 3:
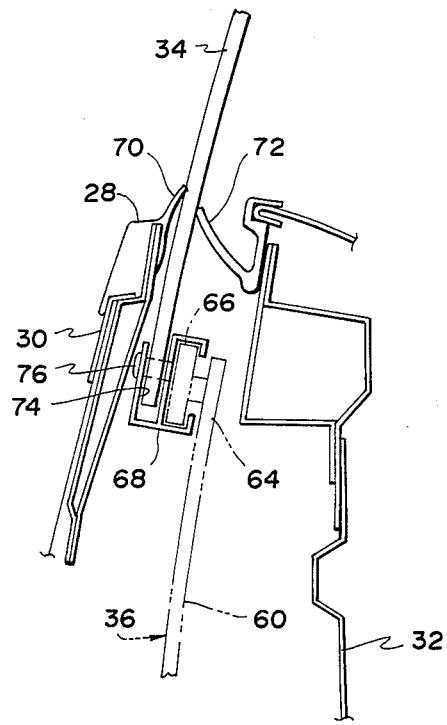
FIG. 3 is a longitudinal sectional view taken along the direction of line 3—3 in FIG. 1 to illustrate the manner in which the first rear quarter window assembly is mounted.

As shown in FIGS. 4 and 5, the window regulator 36 includes a regulating arm 60 having a first end 62 that is pivotally mounted on the vehicle body for movement about an axis A under either a manual or power operated mode of operation. The other end 64 of arm 60 supports a roller 66 that is received within a window regulator member 68. This window regulator member 68 as shown in FIG. 3 has a channel shaped cross section that receives the roller 66 just below outer and inner window seals 70 and 72 at the vehicle body belt line 28. Window regulator member 68 also defines a groove 74 that receives the lower edge of the first rear quarter window 34 for securement thereto by one or more suitable fasteners 76. Swinging movement of regulating arm 60 in cooperation with roller 66 and track 68 thus moves the first rear quarter window 34 between its upper closed position of FIG. 4 and its lower open position of FIG. 5.

As shown in both FIGS. 4 and 5, the rear quarter window assembly includes a track 78 that is mounted in a suitable manner on the vehicle in a generally vertically extending direction with a slight horizontal inclination. A slide 80 is fixed to the first rear quarter window 34 and is slidably supported by the track 78 to provide guided movement thereof between the upper closed position shown of FIG. 4 and the lower open position shown of FIG. 5 upon operation of the window regulator 36 as described above.

As best illustrated in FIG. 4, the second rear quarter window 40 has a rear edge 82 that is inclined with respect to the horizontal in the closed position. The convertible top frame 22 shown in FIG. 2 has a side rail 83 including a rear rail member 84 that, as shown in FIG. 4, supports the rear edge 82 of the second rear quarter window 40 to provide movement thereof in a substantially vertical plane between the closed and open positions respectively illustrated by FIGS. 4 and 5 upon movement of the convertible top frame between the raised and storage positions. More specifically, the rear rail member 84 has a lower end 86 that is pivotally supported for movement about an axis B by a vehicle mounted bracket 88 which also supports the upper end of the track 78.

While the best mode for carrying out the invention has been described in detail, those familiar with the art to which this invention relates will recognize various alternative designs and embodiments for practicing the invention as described by the following claims.

What is claimed is:

1. In a convertible vehicle including an occupant compartment, a side door for providing access to the occupant compartment, and a convertible top having a frame and a soft top supported by the frame for movement between raised and storage positions with respect to the occupant compartment, a rear quarter window inside surfaces on which the first and second seal members are mounted.

5. A rear quarter window assembly as in claim 4 wherein one of the seal members includes a sealing portion located between the rear edge of the first rear quarter window and the front edge of the second rear quarter window.

6. A rear quarter window assembly as in claim 5 wherein the first seal member on the rear edge of the first rear quarter window includes the sealing portion located between the rear edge of the first rear quarter window and the front edge of the second rear quarter window.

7. A rear quarter window assembly as in claim 4 wherein one of the seal members defines a groove and the other seal member includes a projection that is received within the groove of the one seal member with the rear quarter windows in the closed positions.

8. A rear quarter window assembly as in claim 7 wherein the first seal member on the rear edge of the first rear quarter window defines the groove and wherein the second seal member on the front edge of the second rear quarter member includes the projection.

9. A rear quarter window assembly as in claim 3 wherein one of the seal members includes a sealing portion located between the rear edge of the first rear quarter window and the front edge of the second rear quarter window, said one seal member also defining a groove, and the other seal member including a projection that is received within the groove of the one seal member with the rear quarter windows in the closed positions.

10. A rear quarter window assembly as in claim 2 further including a guide that supports the first rear quarter window at its rear edge for vertical movement between the upper closed and lower open positions.

11. A rear quarter window assembly as in claim 10 wherein the guide includes a track mounted on the vehicle and a slide fixed to the first rear quarter window raised position and an open position with the convertible top frame in the storage position; the second rear quarter window having a front edge that seals with the rear edge of the first rear quarter window with both rear quarter windows in the closed positions; and a seal that provides sealing between the rear edge of the closed first rear quarter window and the front edge of the closed second rear quarter window.

14. In a convertible vehicle including an occupant compartment, a side door for providing access to the occupant compartment, and a convertible top having a frame including a side rail having a rear rail member and also having a soft top supported by the frame for movement between raised and storage positions with respect to the occupant compartment, a rear quarter window assembly located to the rear of the side door and comprising: a first rear quarter window; a window regulator for moving the first rear quarter window vertically between an upper closed position and a lower open position; the first rear quarter window having a rear edge that is spaced forwardly from the frame of the raised convertible top with the first rear quarter window in the upper closed position; a second rear quarter window having a rear edge fixedly mounted on the rear rail member of the frame of the convertible top for movement in a substantially vertical plane between a closed position with the convertible top frame in the raised position and an open position with the convertible top frame in the storage position; the second rear quarter window having a front edge that seals with the rear edge of the first rear quarter window with both rear quarter windows in the closed positions; and a seal including a first seal member on the rear edge of the first rear quarter window and a second seal member on the front edge of the second rear quarter window for cooperatively providing sealing between the closed first and second rear quarter windows.

15. In a convertible vehicle including an occupant compartment, a side door for providing access to the occupant compartment, and a convertible top having a frame including a side rail having a rear rail member and also having a soft top supported by the frame for movement between raised and storage positions with respect to the occupant compartment, a rear quarter window assembly located to the rear of the side door and comprising: a first rear quarter window; a window regulator for moving the first rear quarter window vertically between an upper closed position and a lower open position; the first rear quarter window having a rear edge that is spaced forwardly from the frame of the raised convertible top with the first rear quarter window in the upper closed position; a second rear quarter window having a rear edge fixedly mounted on the rear rail member of the frame of the convertible top for movement in a substantially vertical plane between a closed position with the convertible top frame in the raised position and an open position with the convertible top frame in the storage position; the second rear quarter window having a front edge that seals with the rear edge of the first rear quarter window with both rear quarter windows in the closed positions; a seal including a first seal member on the rear edge of the first rear quarter window and a second seal member on the front edge of the second rear quarter window; one of the seal members defining a groove; and the other seal member defining a projection that is received within the groove of the one seal member with the first and second rear quarter windows closed to provide sealing between the closed rear quarter windows.

16. In a convertible vehicle including an occupant compartment, a side door for providing access to the occupant compartment, and a convertible top having a frame including a side rail having a rear rail member and also having a soft top supported by the frame for movement between raised and storage positions with respect to the occupant compartment, a rear quarter window assembly located to the rear of the side door and comprising: a first rear quarter window; a guide including a vehicle mounted track and a slide on the first rear quarter member received by the track to count the first rear quarter window for movement between an upper closed position and a lower open position; a window regulator for moving the first rear quarter window vertically between the upper closed position and the lower open position; the first rear quarter window having a rear edge that is spaced forwardly from the frame of the raised convertible top with the first rear quarter window in the upper closed position; a second rear quarter window having a rear edged fixedly mounted on the rear rail member of the frame of the convertible top for movement in a substantially vertical plane between a closed position with the convertible top frame in the raised position and an open position with the convertible top frame in the storage position; and the second rear quarter window having a front edge that seals with the rear edge of the first rear quarter window with both rear quarter windows in the closed positions; a seal including a first seal member on the rear edge of the first rear quarter window and a second seal member on the front edge of the second rear quarter window; one of the seal members defining a groove; and the other seal member defining a projection that is received within the groove of the one seal member with the first and second rear quarter windows closed to provide sealing between the closed rear quarter windows.

* * * * *